US008903869B2

(12) United States Patent
Stejic et al.

(10) Patent No.: US 8,903,869 B2
(45) Date of Patent: Dec. 2, 2014

(54) OBJECT LINKAGE SYSTEM, OBJECT LINKAGE METHOD AND RECORDING MEDIUM

(75) Inventors: Zoran Stejic, Tokyo (JP); Laszlo Kovacs, Budapest (HU)

(73) Assignee: Ricoh Company, Ltd., Tokyo (JP)

( * ) Notice: Subject to any disclaimer, the term of this patent is extended or adjusted under 35 U.S.C. 154(b) by 1165 days.

(21) Appl. No.: 12/403,417

(22) Filed: Mar. 13, 2009

(65) Prior Publication Data

US 2009/0234884 A1  Sep. 17, 2009

(30) Foreign Application Priority Data

Mar. 17, 2008 (JP) .................................. 2008-068096

(51) Int. Cl.
*G06F 17/30* (2006.01)
*G06F 7/00* (2006.01)

(52) U.S. Cl.
CPC ................................. *G06F 17/30607* (2013.01)
USPC ......................................................... 707/802

(58) Field of Classification Search
USPC ......................................................... 707/802
See application file for complete search history.

(56) References Cited

U.S. PATENT DOCUMENTS

| 6,230,212 | B1 * | 5/2001 | Morel et al. .................. 719/316 |
| 7,203,673 | B2 * | 4/2007 | Tsuda .................................... 1/1 |
| 7,624,125 | B2 * | 11/2009 | Feinsmith ............................. 1/1 |
| 7,792,868 | B2 * | 9/2010 | Finkelstein et al. .......... 707/798 |
| 2002/0065845 | A1 * | 5/2002 | Naito et al. ................. 707/500.1 |
| 2007/0244859 | A1 * | 10/2007 | Trippe et al. ...................... 707/3 |
| 2008/0294651 | A1 * | 11/2008 | Masuyama et al. ........... 707/100 |
| 2009/0070101 | A1 * | 3/2009 | Masuyama et al. ............... 704/9 |

FOREIGN PATENT DOCUMENTS

| JP | 3547159 | 7/2004 |
| JP | 2005-346199 | 12/2005 |
| JP | 2005-352730 | 12/2005 |

* cited by examiner

*Primary Examiner* — Kimberly Wilson
(74) *Attorney, Agent, or Firm* — IPUSA, PLLC (57) ABSTRACT

An object linkage system including: a database that stores objects and a linkage map; a unit for extracting an already-registered object to be linked with a new object from already-registered objects and copying a first linkage attribute value of the already-registered object to the new object as a second linkage attribute value of the new object; a unit for registering the new object into the linkage map by associating the new object with an identification value which identifies an object set which contains objects having the second linkage attribute value in common; and a unit for receiving a linkage request from a user terminal, obtaining an object set from the linkage map, and launching creation systems for operating element objects of the object set so as to enable the user terminal to browse the element objects.

15 Claims, 11 Drawing Sheets

| OBJECT ID | 400 |
| OBJECT TYPE | 402 |
| LINKAGE ATTRIBUTE | 404 |
| — ATTRIBUTE 1 | |
| — ATTRIBUTE 2 | |
| — ... | |
| CONTENTS | 406 |
| — ATTRIBUTE 1 | |
| — ATTRIBUTE 2 | |
| — ... | |

FIG.4B

| CALENDAR ENTRY 1 |
| MEETING |
| LINKAGE ATTRIBUTE |
| — DATE AND TIME |
| — PLACE |
| — PARTICIPANT |
| ... |
| CONTENTS |
| MEETING DETAILS |
| ... |

FIG.4C

| MEETING MINUTES |
| DOCUMENT |
| LINKAGE ATTRIBUTE |
| — DATE AND TIME |
| — PLACE |
| — PARTICIPANT |
| ... |
| CONTENTS |
| MEETING DETAILS |
| ... |

FIG.5

| LINKAGE SOURCE OBJECT TYPE | LINKAGE DESTINATION OBJECT TYPE | MAPPING ID |
|---|---|---|
| OBJECT TYPE 1 | OBJECT TYPE 2 | MAPPING ID_1 |
| OBJECT TYPE 2 | OBJECT TYPE 1 | MAPPING ID_2 |
| OBJECT TYPE 1 | OBJECT TYPE 3 | MAPPING ID_3 |
| ... | ... | ... |

| LINKAGE OBJECT ID | ELEMENT OBJECT ID |
|---|---|
| <LINKAGE OBJECT ID_1> | <OBJECT ID_1>, <OBJECT ID_9> |
| <LINKAGE OBJECT ID_2> | <OBJECT ID_2>, <OBJECT ID_3><br><OBJECT ID_12>, <OBJECT ID_15> |
| <LINKAGE OBJECT ID_3> | <OBJECT ID_5>, <OBJECT ID_8><br><OBJECT ID_11> |
| ... | ... |

FIG.8

| OBJECT TYPE | DISPLAY FRAME | OBJECT ID |
|---|---|---|
| <OBJECT TYPE 1> | <DISPLAY FRAME 1> | <OBJECT ID_2> |
| <OBJECT TYPE 2> | <DISPLAY FRAME 2> | <OBJECT ID_4> |
| <OBJECT TYPE 3> | <DISPLAY FRAME 3> | <OBJECT ID_5> |
| ... | ... | ... |

OBJECT LINKAGE SYSTEM, OBJECT LINKAGE METHOD AND RECORDING MEDIUM

BACKGROUND OF THE INVENTION

1. Field of the Invention

The present invention relates to a technique for linking a plurality of objects. More particularly, the present invention relates to an object linkage system, an object linkage method and a computer readable recording medium storing a program for efficiently linking related objects with each other to enable an information processing apparatus to process the linked objects.

2. Description of the Related Art

There are many different kinds of objects in a work environment. For example, as these objects, there are a schedule, an event, a meeting, a document, a forum, a workflow, a calendar, and a project. Each object includes its contents and metadata in which the object is described for easy searching. For example, as to a schedule object, its metadata includes "heading", "person in charge" and "deadline". As to an event object, its metadata includes "heading", "place" and "date and time". As to a meeting object, its metadata includes "participant" in addition to the metadata ("heading", "place" and "date and time") of the event object.

Typically, the above-mentioned different kinds of objects are handled by different systems. For example, a calendar (scheduler) system processes the schedule, event and meeting objects, a system related to documents/contents processes the document object, a discussion aid system (chat system) processes the forum object, and a workflow system processes the workflow object. Further, a project management system processes the project object.

On the other hand, each system can be also used for processing metadata/contents of the object handled by the system. However, most systems do not have a capability for processing metadata/contents of an object processed in a different system. For example, the calendar (scheduler) system handles entries on the meeting object, but the calendar system cannot be used for changing a participant list in minutes of a corresponding meeting. The participant list needs to be handled by the document management system.

Systems in which cooperative work is performed among a plurality of users have been proposed in the past. For example, Japanese Laid-Open Patent Application No. 2005-346199 discloses an information editing apparatus for saving time and effort for inputting information. The disclosed information editing apparatus includes a table update unit for updating registration information in accordance with agreement/disagreement between input title and stored title using a related table that stores schedule titles. In addition, Japanese Laid-Open Patent Application No. 2005-352730 discloses an information processing apparatus for executing an application using an intuitive operation. The disclosed information processing apparatus detects a category of a selected character string to display information, specified by the character string, corresponding to the category. Further, Japanese Patent No. 3547159 discloses a cooperative work aid system including a plurality of computer systems providing cooperative work areas on display screens. The disclosed cooperative work aid system provides cooperative work areas corresponding to characteristics of business.

However, in the above-mentioned techniques, many systems handling different kinds of objects are independent from each other. Thus, even though objects handled by different systems are related with each other, the related objects cannot be linked with each other. More particularly, although the document management system stores meeting minutes of particular meetings, the meeting minutes are not linked with corresponding meeting entries in the calendar (scheduler) system.

So, there has been no conventional technique, based on a computer system, for accessing the meeting minutes from the calendar system or for accessing meeting entries from the document management system, or the like. Thus, in conventional techniques, it takes time and requires manual work to access related objects in different systems.

In addition, even though an object in a system is connected with a related object in a different system, there has been no technique for reflecting changes applied to the object in the related object of the different system, that is, there has been no technique for linking the object with the related object in the different system. As an example for this, a case is considered in which a Gantt chart of a project activity in a project management system is connected with a presentation document processed by a document management system for discussion in a meeting. Even though the Gantt chart is changed as a result of the discussion, there is no system based technique for reflecting the change in the project management system. Thus, it requires not only time but also interactive operations to reflect changes of the object in a related object in a different system, which tends to cause mistakes.

In addition to that, even if changes applied to an object in a system are reflected in a related object in a different system using a conventional manual method, it takes time to perform switching between two systems since the two systems are independent from each other, and two objects cannot be synchronized with each other in real time. Thus, these two objects are recognized and operated sequentially in a conventional technique.

As to this problem, a case can be taken as an example in which a user is watching a Gantt chart of a project activity using a project management system, and another user is watching a presentation including a copy of the Gantt chart using a document management system. In this case, when a user changes the Gantt chart, another user instantly watches a version of a Gantt chart which is not the newest one, and the other user does not know that the Gantt chart is not the newest. Also, the user who changed the Gantt chart does not become aware that the other user is watching the old version at the same time using a different system.

As a result, it is realistically impossible for users to maintain synchronization between related objects in different systems with reliability.

That is, an object of the present invention is to provide an object linkage system, an object linkage method and a computer readable recording medium storing a program for efficiently linking related objects such that the related objects can be processed in an information processing apparatus.

SUMMARY OF THE INVENTION

For solving the above-problem, an embodiment of the present invention is configured as an object linkage system for linking a plurality of objects for causing a user terminal to use linked objects, including:

a database configured to store objects each including linkage attribute values used for linking objects, and to store a linkage map designating a set of objects to be linked with each other;

an object registration unit configured to search for a linkage candidate of a new object by comparing a value of an item included in contents of the new object with a linkage attribute value of already-registered objects, and to copy a linkage attribute value of an already-registered object to be linked with the new object to the new object as an linkage attribute value of the new object in order to register the new object in the database;

an object linkage unit configured to register an object set which contains objects having a common linkage attribute value by associating the object set with an identification value for identifying the object set; and an object editing unit configured to receive a linkage request from a user terminal, obtain the object set from the linkage map, assign element objects of the object set to display areas designated by a display information table, and launch creation systems for operating the element objects in order to enable the user terminal to browse the element objects.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS (Outline)

In an embodiment of the present invention, linkage attributes are added to metadata structure of objects generated by different creation systems, in which the linkage attributes are for enabling a server to identify objects which may be linked and operated by the user. The linkage attributes are generated by extracting keywords included in contents of the objects, in which the keywords are words, numeric values, dates and the like for describing heading, items, and table of contents and the like included in the contents of the objects.

When a new object is generated by a particular creation system, an object type is set for the object, in which the object type is determined depending on the creation system, and the object type is set so as to specify the creation system such as calendar, scheduler and the like. After that, the object linkage system searches database for objects that are candidates of linkage processing in order to select objects to be linked.

The search of objects is performed using degree of agreement between a first value of the newly generated object and a second value of already registered objects. The first value is a value of heading, item, or table of contents in contents part of the object or a keyword in the contents. The second value is a value included in linkage attributes of the already registered object.

When an object to be linked with the newly generated object is found, linkage attributes of the found object are copied to linkage attributes of the new object and the new object is registered. At the same time, in order to refer to linkage of a plurality of objects, a linkage object ID is added to the plurality of objects, and the linkage object ID is registered in a linkage map which associates a set of objects with the linkage object ID. Therefore, for linking a plurality of objects, it becomes possible to use particular linkage attributes as indexes for a plurality of objects that may be linked with each other depending on the kinds of creation systems, and to perform efficient linkage call and efficient operation for objects.

When the object linkage system receives a request of linkage processing from a user, for pre-registered linkage calling, the object linkage system allocates display areas corresponding to the number of objects using object types, display areas, and object IDs uniquely identifying objects registered in a display information table. After that, in each display area, the object linkage system passes, to each creation system, an object ID registered in the display information table as an argument to call an object in order to call the creation system, so that the object is displayed on the user terminal. Thus, when the user performs work by referring to a plurality of related objects in parallel, work efficiency can be improved.

In addition, when a particular object is referred to from a plurality of user terminals, the object linkage system identifies editing of the object by a user terminal, and displays the edited result to other user terminals browsing the object at the time. Thus, even when a displayed object on a user terminal is edited via another user terminal, the object can be displayed synchronously with minimum time lag, so that editing efficiency improves.

In addition, the object linkage system of the present embodiment causes a user terminal to display identification data for uniquely identifying users accessing a same object on a display area so as to notify the user that an object accessed by the user is being browsed by a plurality of users. In addition, hyper-linked mail address can be displayed so that realtime communication becomes available among users who are editing the object.

(Embodiments)

Figure 1:
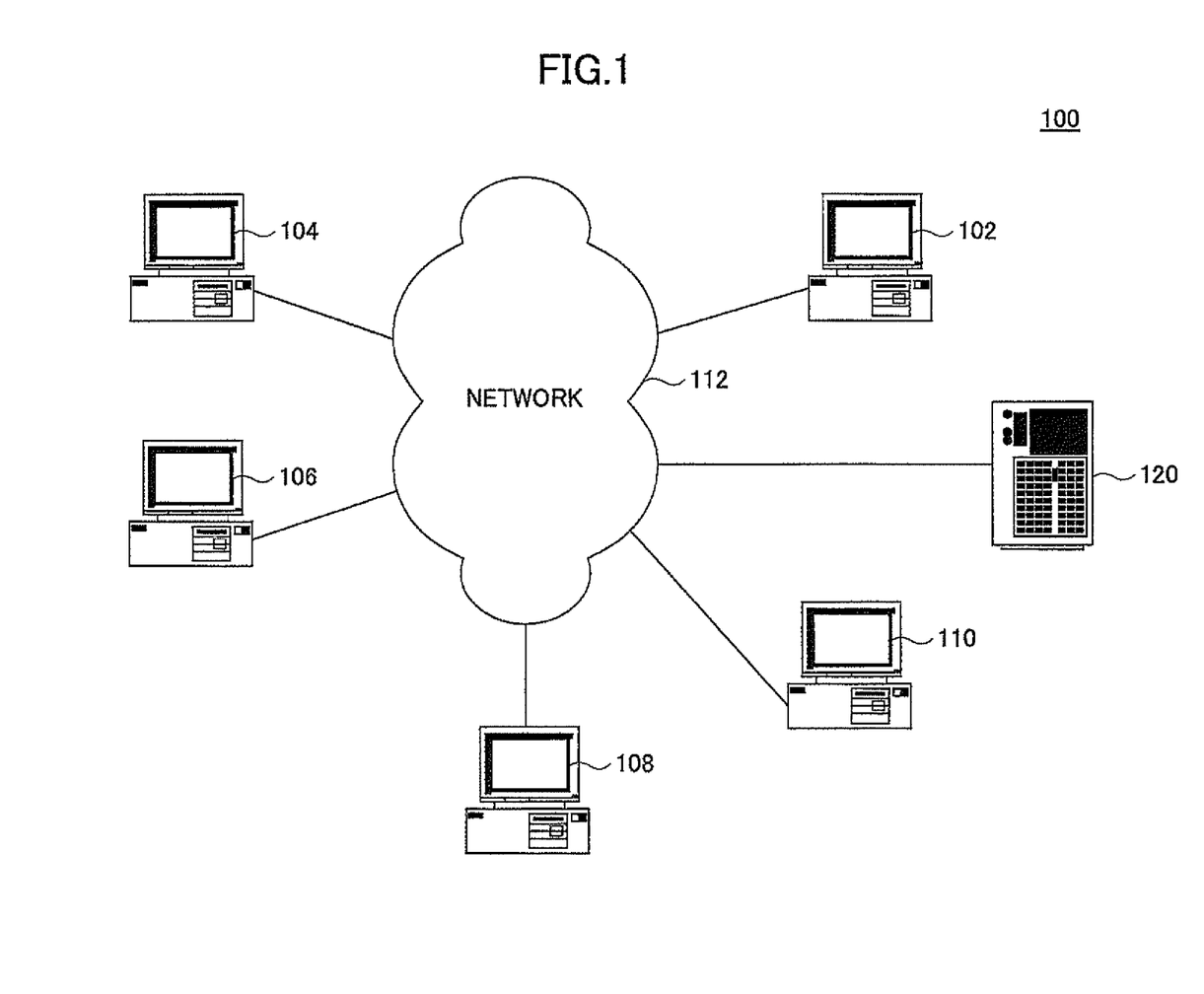
FIG. 1 is a diagram showing an object linkage system 100 of an embodiment of the present invention.

In the following, although embodiments of the present invention are described, the present invention is not limited to the after-mentioned embodiments. FIG. 1 shows an object linkage system 100 according to an embodiment of the present invention. The object linkage system 100 includes a server 120 and a plurality of user terminals 102, 104, 106, 108, and 110 that are connected to a network 112. Each user terminal is operated by a user to access the server 120 via the network 112.

Although not limited to a particular apparatus, the server 120 is configured as an information processing apparatus, and can be configured as a Web server or as a server for constituting a client-server system using a distributed computing platform. When the server 120 is configured as a Web server, data sending and receiving are performed between the user terminal and the server 120 using a file transfer protocol such as the HTTP protocol based on a transaction protocol such as TCP/IP.

In addition, for configuring the client-server system, results of processing of the server 120 can be transferred to the user terminals 102-110 using a distributed computing platform such as RMI (Remote Method Invocation), RPC (Remote Procedure Call), CORBA (Common Object Resource Broker Architecture) and EJB (Enterprise Java Beans). The network 112 can be configured to arbitrarily include the Internet, WAN (Wide Area Network) or LAN (Local Area Network) or the like, but is not limited to a particular one.

The server 120 can implement a CISC architecture microprocessor (MPU) such as PENTIUM or PENTIUM compatible chip or the like, or implement a RISC architecture microprocessor such as POWER PC. In addition, the server 120 is controlled by an operating system such as WINDOWS 200X, UNIX, and LINUX, and executes a server program such as CGI, Servlet and APACHE using a programming language such as C++, JAVA, PERL and RUBY to send process results of the server 120 to each of user terminals 102-110.

Each of the user terminals 102-110 can have any configuration as long as it is a personal computer or a portable terminal such as PDA, and it can access the server 120 via the network 112. When the server 120 is configured to be a Web server, it is desirable that each of the user terminals 102-110 implements browser software such as Internet Explorer, Mozilla, Opera and Netscape Navigator.

In the following, a user terminal in the user terminals 102-110 may be represented as "a user terminal 102-110". Also, more than one user terminals that are included in the user terminals 102-110 may be represented as "user terminals 102-110".

Figure 2:
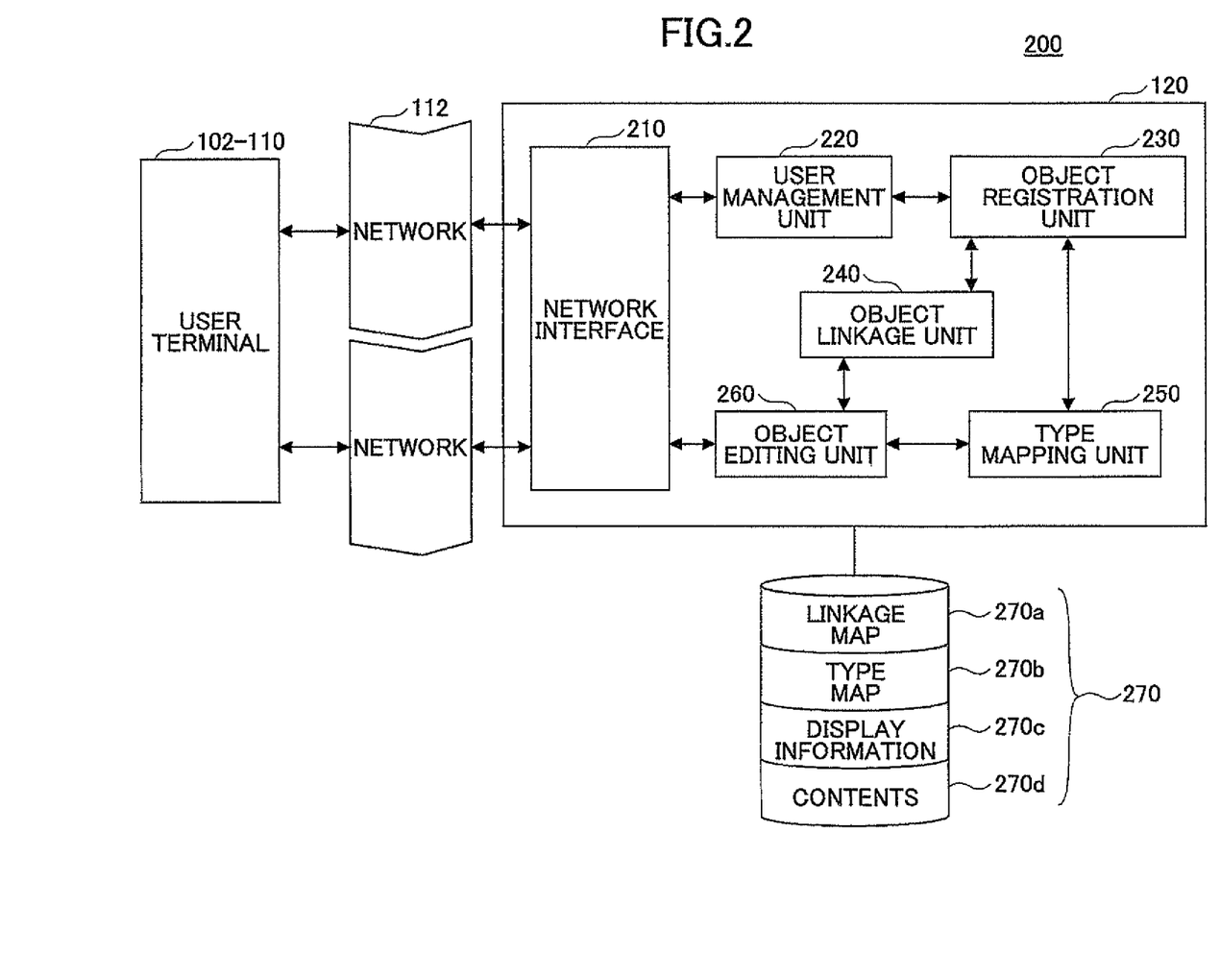
FIG. 2 is a diagram showing functional blocks 200 of the object linkage system 100 of the embodiment of the present invention.

FIG. 2 shows an embodiment of functional blocks 200 of the object linkage system 100. The server 120 receives a request from a user terminal 102-110 via the network 112 to cause the user terminal 102-110 to display a plurality of objects by linking them. In addition, the server 120 permits a plurality of user terminals 102-110 to brows a same object. In addition, when the object is edited, the server 120 displays edited contents of the object to the user terminals which are browsing the object in order to achieve synchronization of the contents of the object.

The functional blocks 200 of the server 120 include a network interface 210, a user management unit 220 and an object registration unit 230. The server 120 receives a request from a user terminal 102-110 and returns a linkage screen provided as a result of object linkage to the user terminal 102-110 via the network interface 210. The user management unit 220 checks user authority of the user terminals 102-110, and manages a user status table including information indicating which objects users accessing the server 120 are displaying or editing.

The user status table registers user IDs for uniquely identifying users, identification information such as face photographs, mail addresses that are different from the user IDs, access time stamp, object IDs of processing objects, process status indicating status of browsing or editing, and the like. When linking and displaying objects, the object linkage system 100 determines work status of objects on the network based on the user status table to perform the linkage, display and synchronization.

In addition, the object registration unit 230 registers an object sent from a user terminal 102-110 in a database 270, for example. In addition, the object registration unit 230 analyzes a text part of the object to extract a content attribute that functions as metadata characterizing the object and registers the content attribute by associating it with the object. The extraction of keywords can be performed using any conventional techniques, and can be performed using TF-IDF (Term Frequency-Inverted Document Frequency), for example.

In addition, the object registration unit 230 functions as object registration means configured to register an object into the database and to perform indexing of linkage attributes, content attributes and the like. The object registration unit 230 also performs processes for extracting a linkage attribute different from the content attribute for object linkage to register the linkage attribute as metadata. The extraction of the linkage attribute can be performed in the same way as the extraction of the content attribute. But, in the case of an object having a stereotyped format created by a creation system, for the purpose of improving capability of search and linkage, it is desirable to use a value, as the linkage attribute, registered as a registration item that characterizes a particular object. For example, as the registration item, the object registration unit 230 can extract a value described in setting items such as meeting minutes, time and data, participant and place in order to register the value as the linkage attribute.

The type mapping unit 250 functions as type determination means configured to determine a type of an object, and for example, the type mapping unit 250 determines, by using an extension, for example, a type of an object generated by using an application for generating an object such as TODO, calendar, event, meeting, forum, workflow and project in order to register the type as type map data.

The object linkage unit 240 functions as object linkage means configured to manage objects to be linked and displayed on the user terminal 102-110. The object linkage unit 240 selects other objects related to a particular object, adds a linkage object ID to an object set of the particular object and the other object as a linkage object, and generates linkage map data in which the linkage object ID and the object set are registered while being associated with each other in order to register the linkage map data into the database 270. Detailed function of the object linkage unit 240 is described later in detail with data structures.

The object editing unit 260 functions as object editing means, and the object editing unit 260 receives an object generating/editing request from a user terminal 102-110 to generate an object, and edits an object that is already generated. For this purpose, the object editing unit 260 also functions as a display interface for the user terminals 102-110 to provide a window generating function, display frame assigning function, and an object update process function and the like.

In addition, in the present embodiment, the object editing unit 260 extracts an already generated object to be linked with a new object, passes an object ID that is an extraction result to the object registration unit 230 to cause the object registration unit 230 to perform linkage processes. This process can be automatically performed by the object editing unit 260 using values of extraction ranking, or can be performed by passing the extraction results to the user terminal to perform selection.

The data such as contents of an object, a linkage map 270*a* and a type map 270*b* are stored in the database 270 in a hard disk device functioning as storage means. And, the data is read by the object editing unit 260 and the like in response to a request by the user terminal 102-110 so that processes corresponding to the request from the user terminal 102-110 are performed.

In addition, the database 270 includes a display information table 270c for designating a creation system, a display area and an object ID for causing a user terminal to display objects when performing object linking and displaying, so that the linkage and display process is available in response to a linkage display request from the user. By the way, it is not essential that the display information table 270c is registered as an attribute of an object. For example, the display information table 270c can be configured as a table managed by the object editing unit 260. In addition, the database 270 registers contents 270d that are body parts of objects in which attribute data of the objects are excluded. The database 270 passes contents designated by a request from a user to the object editing unit 260 in order to enable the system to perform displaying/processing operation.

Figure 3:
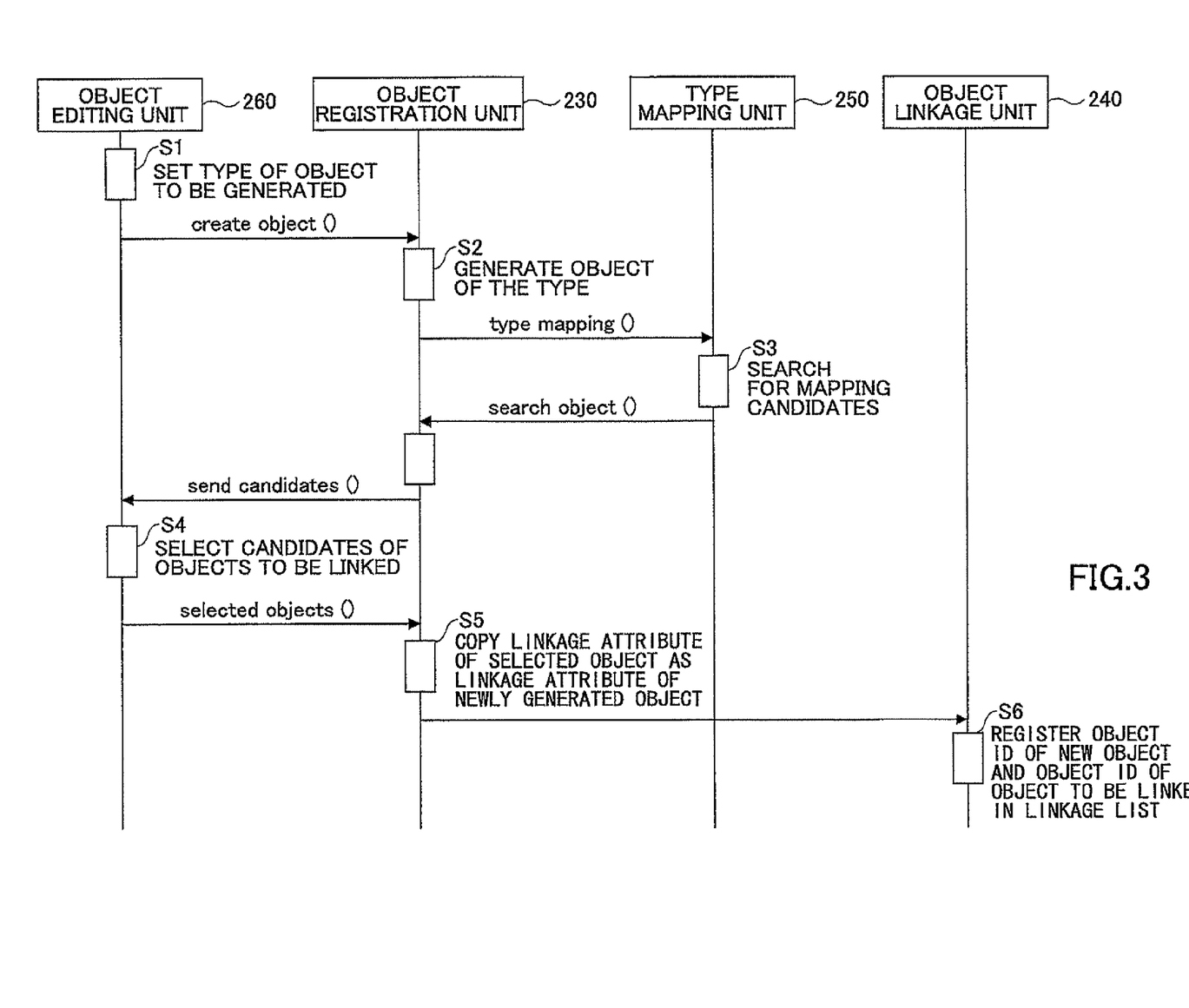
FIG. 3 is a sequence chart showing processes performed by the object linkage system 100 of the embodiment of the present invention.

FIG. 3 is a sequence chart showing processes performed by the object linkage system 100 of the present embodiment. As shown in FIG. 3, the object linkage system 100 launches an application in step S1 to set a type of an object to be generated. This process is determined according to which application is launched in response to a request from a user terminal 102-110. After the process in step S1 ends, the object editing unit 260 issues a request of create object( ) to the object registration unit 230 to register an object of the type in the database 270 and the like in step S2.

After the generated object is registered in the database 270, the object registration unit 230 checks contents of the object, extracts content attributes and linkage attributes that are values for indexing in order to register each of them as indexing data of the object by associating them with the object. For example, as to a schedule, it is desirable to use values described in items of "headline", "person in charge" and "deadline" as linkage attributes since a plurality of objects can be associated with events related to an object with reliability. For the same reason, as to events, it is desirable to use values described in items of "headline", "place" and "date and time", and as to meetings, it is desirable to use values described in metadata (such as "headline", "place" and "date and time") of the event and a value described in an item of "participant".

In step S3, in order to link a newly registered object to an already registered object in the database 270, the type mapping unit 250 searches the database 270 for an object to be entered in the linkage map 270a using a value of content attributes. For this purpose, the type mapping unit 250 issues a search object( ) request to the object registration unit 230 for causing the object registration unit 230 to search for the object. In that process, in the values of content attributes generated in step S3, the type mapping unit 250 passes, as arguments of the search object( ) request, registered values corresponding to items included in the contents and a value of an object type. The value of the object type is used for narrowing search space using a type of an object that may be linked. The object registration unit 230 searches the database 270 to extract candidates, and causes the object editing unit 260 to extract an object ID of an object to be linked in step S4.

The object editing unit 260 performs the extraction by comparing attribute values passed as argument with linkage attribute values of objects managed in the database 270 and by using the degree of agreement of values corresponding to each item. For improving accuracy, a criterion such as equal to or greater than 90% can be provided as the degree of agreement with respect to the attribute value. The threshold set as the criterion can be determined as necessary in consideration of accuracy. In addition, if a plurality of candidates are extracted according to characteristics of objects, degree of agreement of content part of objects can be further used for narrowing extracted contents.

In another embodiment, when a plurality of objects are extracted as candidates, a configuration can be adopted in which the objects are ranked in a descending order of the degree of agreement so that the user selects an object from them.

The object ID for designating an object extracted in step S4 is used as an argument of selected objects( ) that is an object linkage request, and the selection request is issued to the object registration unit 230. When the object registration unit 230 receives the request, the object registration unit 230 copies linkage attributes of the selected object as linkage attributes of the newly generated object. Accordingly, an object having relevance can be registered by associating the object with the already linked object with reliability. In addition, it becomes possible to suppress variations of linkage attributes to a minimum, so that a more reliable linkage function can be provided.

After that, the object registration unit 230 sends the linkage attributes copied in step S5 and object IDs to the object linkage unit 240. In step S6, the object linkage unit 240 registers the received object IDs to the linkage map 270a by associating the object IDs with an identification value for identifying a set of objects having common linkage attributes for linking objects.

Figure 4A:
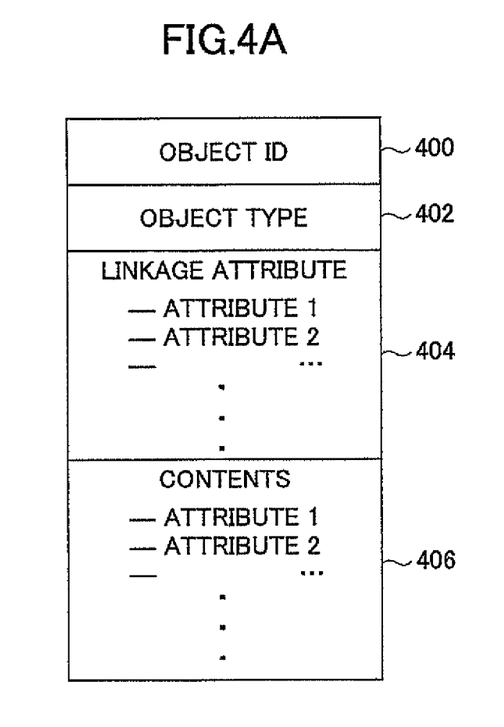
FIGS. 4A-4C shows embodiments of data structures of indexed objects.
Figure 4B:
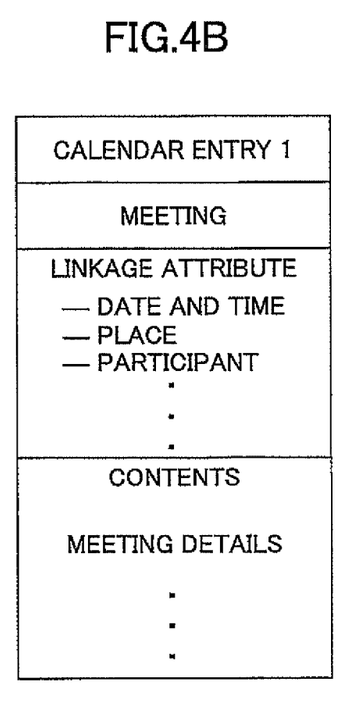
Figure 4C:
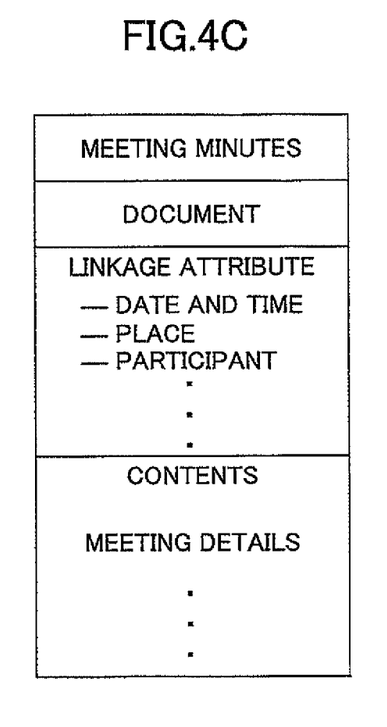

FIGS. 4A-4B show an embodiment of data structures of indexed objects that are generated in the present embodiment. FIG. 4A shows a general data structure of an object of the present embodiment. FIGS. 4B and 4C show exemplary data registered in the linkage map 270a. As shown in FIG. 4A, the data structure includes a field 400 for registering an object ID, a field 402 for registering an object type, a field 404 for registering linkage attributes for linking, and a field 406 for registering content attributes for indexing contents.

The object linkage system 100 refers to the linkage attributes registered in the field 404 to linking a plurality of objects. FIG. 4B shows a data structure of an object generated by a scheduler, and FIG. 4C shows a data structure of meeting minutes generated by a document generation application. Objects shown in FIGS. 4B and 4C are objects linked as an object set. In the embodiment shown in FIGS. 4B and 4C, values of the linkage attributes in the field 404 registered for object linking are the same as values equal to or greater than the threshold, and the objects are registered in the linkage map 270a as objects that can be linked with each other.

Figure 5:
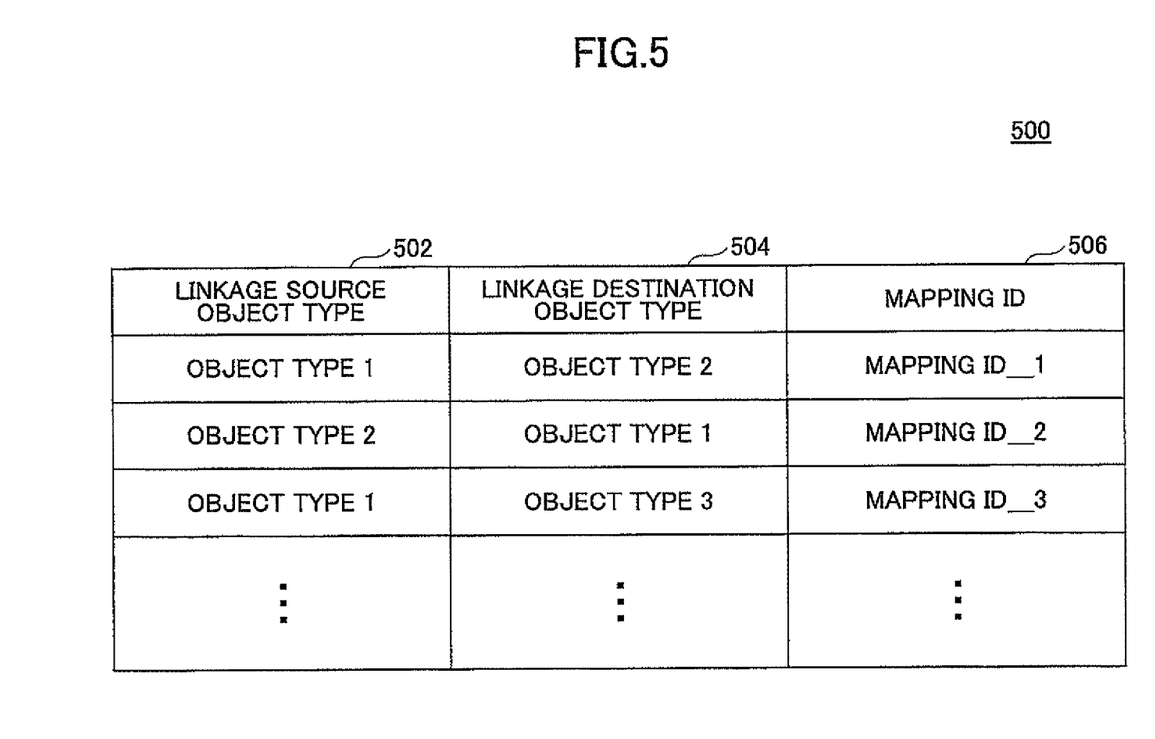
FIG. 5 is a diagram showing an embodiment of a data structure 500 of a type map generated in the present embodiment.

FIG. 5 shows an embodiment of a data structure 500 of the type map generated in the present embodiment. As shown in FIG. 5, the data structure 500 of the type map 270b includes a field 502 for registering a linkage source object type, a field 504 for registering a linkage destination object type, and a field 506 for registering a mapping ID for designating mapping between them. The linkage source object means an object registered earlier and linkage destination object means an object generated later.

The mapping ID is generated as list data generated by extracting a relationship of attributes between the linkage source object and the linkage destination object. The data structure 500 shown in FIG. 5 indicates an object of an object type 1 and an object of an object type 2 by a mapping ID of mapping ID_1. In addition, more detailed descriptions of objects to be mapped are registered by being associated with the mapping ID.

Figure 6:
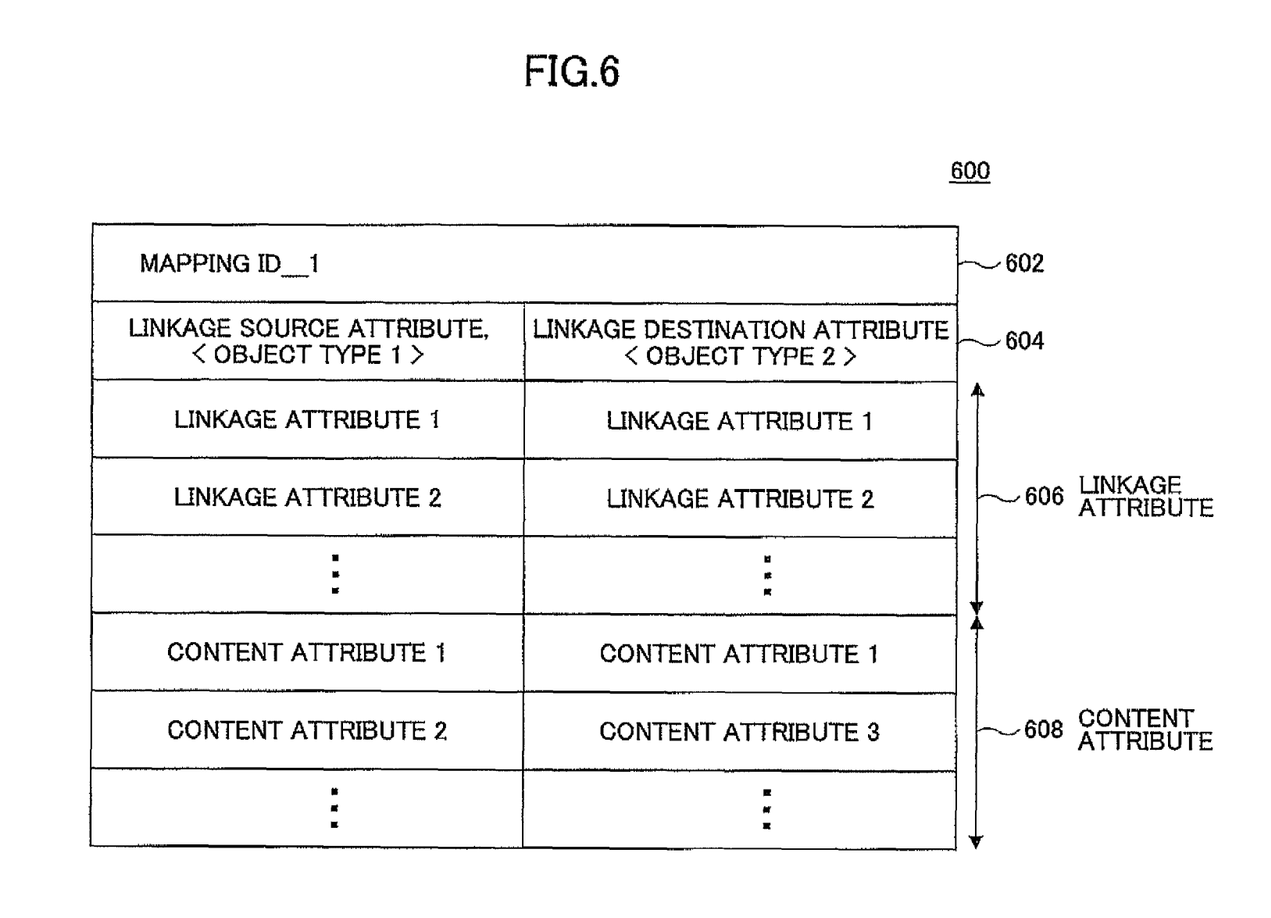
FIG. 6 is a diagram showing an embodiment of a data structure 600 referred to by a mapping ID shown in the data structure 500 shown in FIG. 5.

FIG. 6 shows an embodiment of a data structure 600 referred to by the mapping ID described for the data structure 500 shown in FIG. 5. In the data structure shown in FIG. 6, a mapping ID is registered in a field 602, and each value of linkage attributes and content attributes of objects being mapped earlier and later is registered. In the embodiment shown in FIG. 6, a field 604 for registering an object type is generated for each of the linkage source object and the linkage destination object, and there are entries of linkage attributes 606 and content attributes 608 in each field. Linkage attributes shown in the field 606 are linkage attributes copied from values of linkage source. Thus, they are completely the same in the present embodiment. In this point, as to contents to be added after that, the possibility of being included in the content group can be increased so that object linkage having a higher accuracy can be provided.

Figure 7:
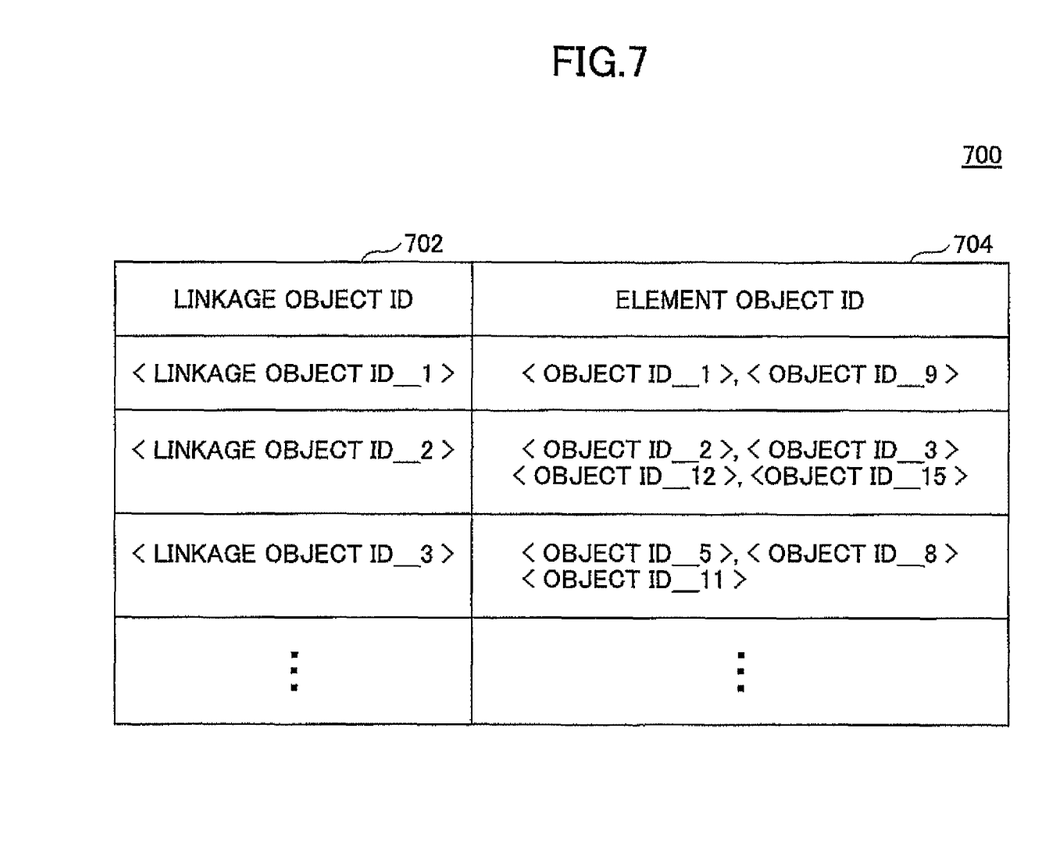
FIG. 7 is a diagram showing an embodiment of a data structure 700 of a linkage map 270a in the present embodiment.

FIG. 7 shows a data structure 700 providing the embodiment of the linkage map 270a. As shown in FIG. 7, the data structure 700 functioning as the linkage map 270a includes a field 702 for registering linkage object IDs, and a field 704 for registering element object IDs.

The linkage object ID is an ID added for uniquely identifying an object set. The element object ID is an object ID of an object that is an element forming the object set. The object linkage system 100 designates a set of objects to be linked with each other using the data structure 700 shown in FIG. 7, generate display areas in which the objects are displayed simultaneously by referring to a display information table, launches a creation system for each display area to cause the creation system to read each object to display each object.

Figure 8:
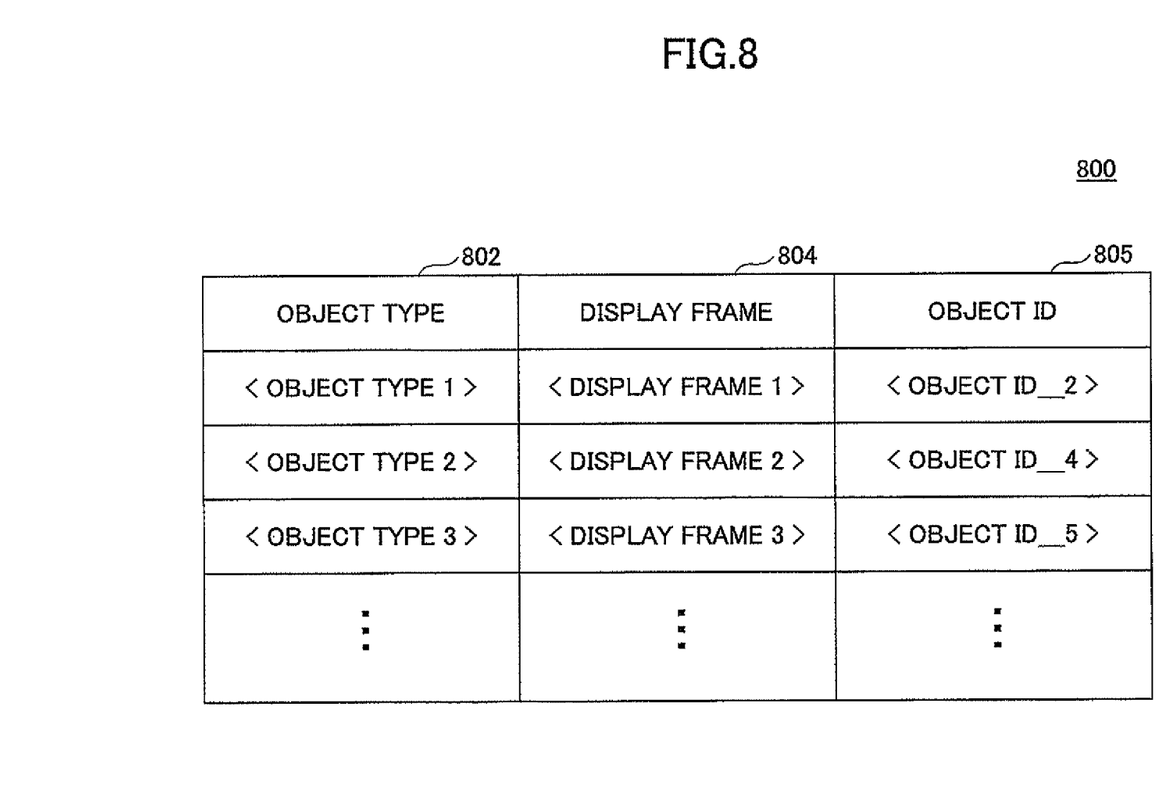
FIG. 8 is a diagram showing an embodiment of a display information table 800 for generating object linkage display areas by an object editing unit 260.

FIG. 8 shows an embodiment of a display information table 800 for the object editing unit 260 to generate object linkage display areas. Display information tables 800 shown in FIG. 8 are generated such that a number of the tables 800 corresponds to a number of records designating linkage object IDs described in FIG. 7, and each of the display information tables 800 is registered by being associated with the corresponding linkage object ID. In addition, as the number of element objects included in a linkage object ID increases, records of the display information table 800 shown in FIG. 8 are added, in order to be able to perform linkage and display. The table 800 includes a field 802 for registering object types, a field 804 designating display frames and a field 805 for registering object IDs.

The object type designates a creation system to be launched for displaying an object, and the display frame 804 is used for assigning a display area for calling the creation system. In addition, the object ID is passed to the creation system as an argument for the launched application to call an object. By launching an application for each display area using the data structure 800 shown in FIG. 8, it becomes possible to display, on one desktop screen, objects to be related with each other by a plurality of different creation systems.

Figure 9:
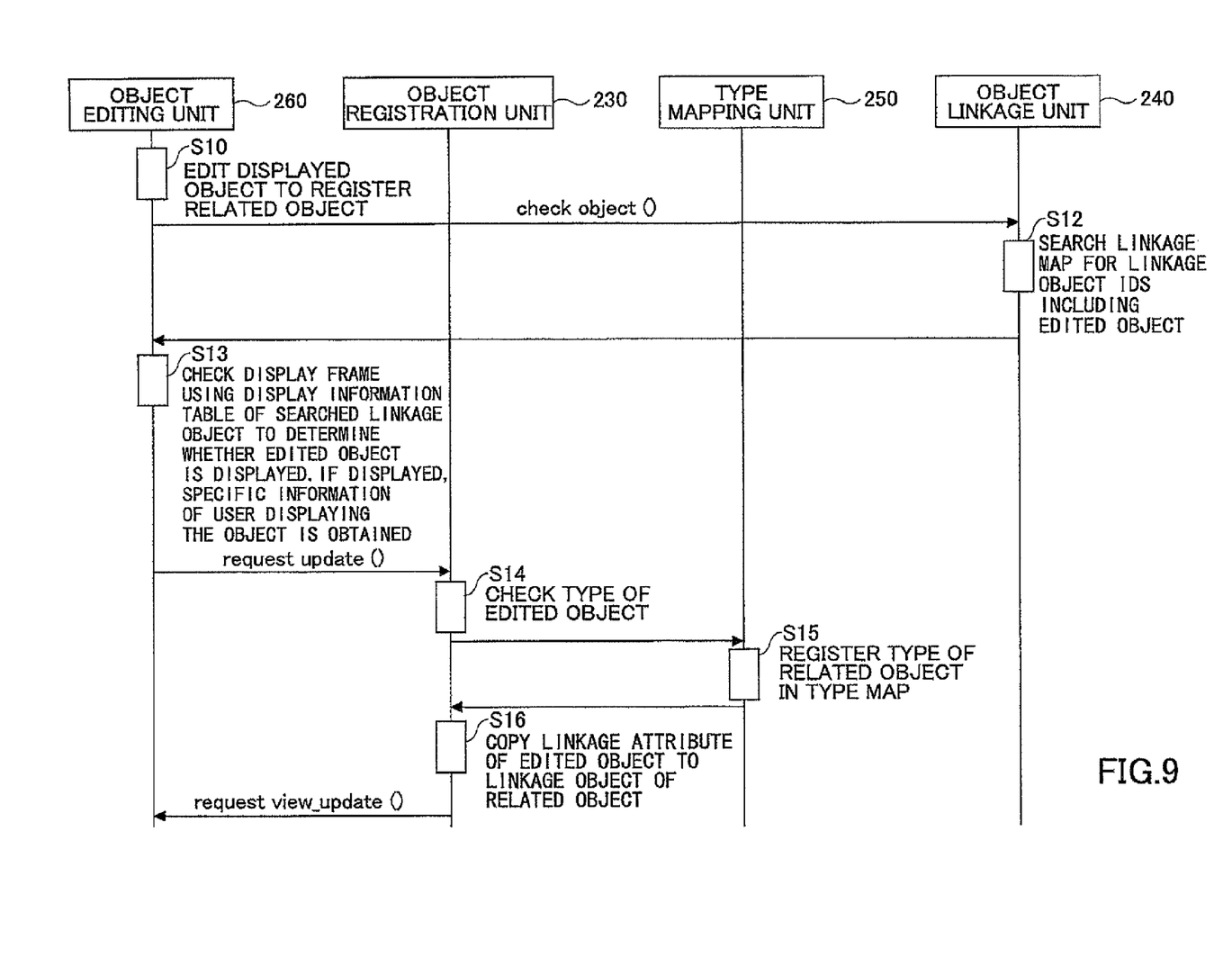
FIG. 9 is a sequence chart showing object synchronization processes in object linkage and display performed in the object linkage system 100 of the present embodiment.

FIG. 9 shows a sequence chart of object synchronization processes in object linkage and display of the object linkage system 100 of the present embodiment. The object editing unit 260 receives a request from a particular user terminal, from the user terminal 102, for example, and edits a displayed object in order to register a related object in step S10. After the object editing unit 260 generates the related object, the object editing unit 260 issues check object( ) to the object linkage unit 240, for checking whether the user is accessing the related object, by adding an identification value of the related object as an argument. The related object can be an object that is periodically generated as a dead copy of the edited object.

In addition, a backup file generated in editing processing can be shared. The object linkage unit 240 searches the linkage map 270a in step S12 to search for linkage object IDs including the edited object. When the object linkage unit 240 cannot find the linkage object ID, the process is stopped so that the system waits for a next request.

On the other hand, when the linkage object ID is found, the object linkage unit 240 issues a notification to the object editing unit 260, so that the object editing unit 260 determines, in step S13, which user terminal displays searched objects by referring to the user status table generated by the user management unit 220. When it is determined that no user terminal displays the edited object, the process is terminated so that the object editing unit 260 waits for a next notification.

On the other hand, when it is determined that there is a use terminal that is browsing the object, the object editing unit 260 obtains specific information of the user displaying the object. After that, the object editing unity 260 passes a request of request update( ) to the object registration unit 230 adding the object ID of the edited object as an argument to request update process. In step S14, the object registration unit 230 checks a type of the edited object to set the type as an object type of the related object, and sends the set object type to the type mapping unit 250. The type mapping unit 250 that receives the information registers the type of the related object into the type map 270b in step S15.

After that, the type mapping unit 250 sends a notification to the object editing unit 230 to copy the linkage attribute values of the edited object to linkage attribute values of the related object in order to update the linkage map 270a in step S16. By this process, the related object that is the edited object is reflected in the linkage map 270a.

The object registration unit 230 issues a request view update( ) instruction to the object editing unit 260 for requesting display update adding, as an argument, the linkage object ID that is assigned to the linked objects in the linkage map 270a in order to cause the object editing unit 260 to perform an update of display screen. Update of the display screen can be performed in various methods. For example, the update can be performed by reading creation systems and objects corresponding to the linkage object ID, once storing display data of the objects into a window buffer, and sending contents of the window buffer to the user terminal at a proper timing in order to cause the user terminal to cache the contents as display data. These instructions and functional units for issuing the instructions form an update unit in the present embodiment.

Figure 10:
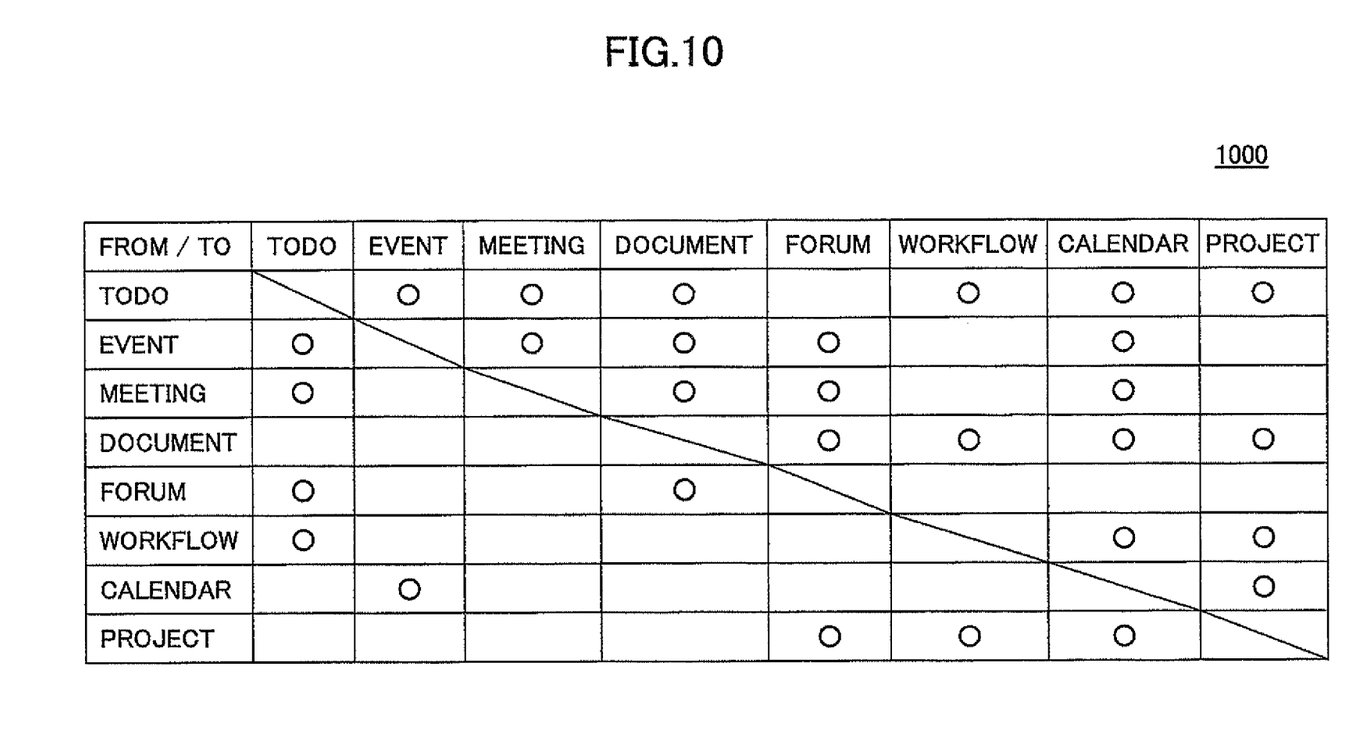
FIG. 10 is a diagram showing a table exemplary showing relationship among objects of creation systems that can be linked with each other in the present embodiment.

FIG. 10 shows a table 1000 exemplary showing relationship among objects of creation systems that can be linked with each other in the present embodiment. The creation system is not limited to a particular one, but can be a creation system including a TODO system, an event management system, a meeting management system, a document management system, a forum management system, a workflow management system, a calendar management system or a project management system.

For example, the embodiment shown in FIG. 10 shows that, when the object type indicates that the object is generated using the TODO system, objects of the event management system, the meeting management system, the document management system, the workflow management system, the calendar management system, and the project management system have relevancy and are included in a search space. In addition, FIG. 10 shows that, when the creation system is the project, objects of forum, workflow, and calendar are linked with each other.

The present embodiment is not limited to these objects and creation systems. Any objects can be registered in the linkage map so as to enable the system to perform linkage and display and to perform linkage works as long as item data used by the creation systems for generating objects are common. In addition, in the present embodiment, by applying the creation system as a work system to objects having stereotyped items, accuracy for extracting objects to be linked including accuracy of contents can be increased. Categories of objects to be applied are not limited to creation systems shown in FIG. 10.

Figure 11:
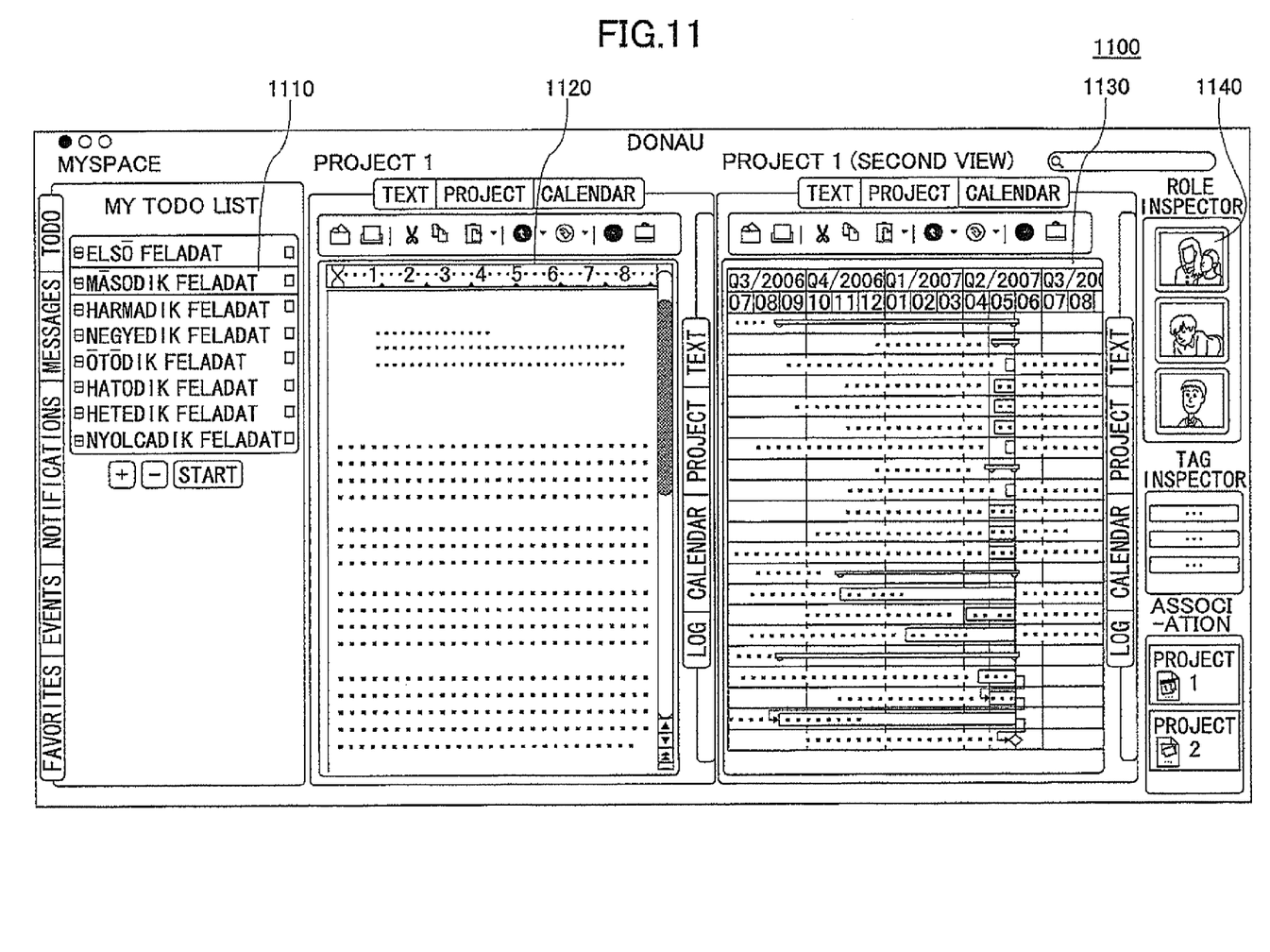
FIG. 11 is a diagram showing an embodiment of a graphical user interface (GUI) 1100 displayed on a display screen of a user terminal by the object linkage system 100 of the present embodiment.

FIG. 11 shows an embodiment of a graphical user interface (GUI) 1100 displayed on a display screen of a user terminal by the object linkage system 100 of the present embodiment. The user sends an object identification value and a request for instructing linkage to the server 120 so that the GUI 1100 shown in FIG. 11 is displayed on the user terminal using window methods, frame objects and the like.

The GUI 1100 shows a display area 1110 for displaying creation systems by which objects are generated, and display areas 1120 and 1130 each for designating element objects indicated by the linkage object IDs. By using the GUI 1100 shown in FIG. 11, the user can simultaneously open and operate objects for which work is to be performed simultaneously. Thus, for operating a plurality of linkage objects, operability and operation efficiency improve by far compared with a case for performing operations by launching individual areas. In the present embodiment, process efficiency can be further improved by embedding interactive links among a plurality of linkage objects displayed on the GUI 1100 by using object link and embedding (OLE), ACTIVE X, and functions equivalent to it.

In addition, in the right side of the GUI 1100, identification data for uniquely identifying the user is shown. More particularly, in the embodiment shown in the figure, a picture of the user is shown. The identification data for uniquely identifying the user is used for indicating that there is a user accessing the object shown on the GUI 1100 at that time. For example, when a user displayed on the display region 1140 edits an object displayed on the display area 1120, the edited result is reflected in the linkage map 270a when a backup file is generated, for example. Thus, it becomes possible to obtain contents changed by the user who is correcting the object remotely with minimum time lag.

In addition, by forming a display area for displaying which users are accessing which objects near the display area 1140, and by using mail addresses as the identification data which are hyper-linked, communication between users become available, so that efficiency of operations and interactive editing improve.

The above-mentioned functions of the present embodiment can be realized by a program that can be executed by an apparatus and that is coded using an object oriented programming language such as C++, Java, Java Beans, Java Applet, Java Script, Perl and Ruby, and the program of the present invention can be stored in a machine readable recording medium such as a hard disk device, CR-ROM, MO, flexible disk, EEPROM, and EPROM, and can be distributed as the recording medium. In addition, the program can be transmitted via a network using a format that can be used by other apparatuses.

The present invention is not limited to the specifically disclosed embodiments, and variations and modifications may be made without departing from the scope of the present invention.

The present application contains subject matter related to Japanese patent application No. 2008-068096, filed in the JPO on Mar. 17, 2008, the entire contents of which being incorporated herein by reference.

What is claimed is:

1. An object linkage apparatus for linking a plurality of objects for causing a user terminal to use linked objects, comprising:
a processor; and
a storage device configured to store objects, each object including contents and linkage attribute values used for linking objects, and to store a linkage map designating a set of objects to be linked with each other, the contents including content attribute values that are indexing values different from the linkage attribute values;
wherein the processor performs as:
an object registration unit configured to search for a linkage candidate of a new object by comparing content attribute values of items included in contents of the new object with linkage attribute values of the items of already-registered objects in order to extract an already-registered object to be linked with the new object at the linkage candidate from the already-registered objects based on degree of agreement between the content attribute values and the linkage attribute values in each of the items, and to copy a first linkage attribute value of the already-registered object extracted based on the degree of agreement to the new object as a second linkage attribute value of the new object in order to register the new object in the storage device, the new object including the contents and the second linkage attribute value which is the same as the first linkage attribute value of the already-registered object;
an object linkage unit configured to register the new object in the linkage map by associating the new object with an identification value, wherein the identification value identifies an object set which contains objects that are different from each other and that have the second linkage attribute value in common; and
an object editing unit configured to receive a linkage request from the user terminal, to obtain the object set from the linkage map, to assign element objects of the object set to display areas designated by a display information table, and to launch creation systems for operating the element objects in order to enable the user terminal to browse the element objects.

2. The object linkage apparatus as claimed in claim 1, wherein the storage device further registers a type map including an object type for identifying each creation system, and the object registration unit searches for the linkage candidate using the content attribute values corresponding to the item and the object type.

3. The object linkage apparatus as claimed in claim 2, wherein, when an object that is currently browsed is edited, the object editing unit updates contents of the object that is currently browsed with contents of a related object including the newest edited contents of the edited object.

4. The object linkage apparatus as claimed in claim 3, wherein the linkage attribute values is a value registered in an item included in the object.

5. The object linkage apparatus as claimed in claim 4, wherein each creation system includes a TODO system, an event management system, a meeting management system, a document management system, a forum management system, a calendar management system, or a project management system.

6. An object linkage method performed by an information processing apparatus for linking a plurality of objects for causing a user terminal to use linked objects, the object linkage method comprising the steps of:

storing objects, in a storage device, each including contents and linkage attribute values used for linking objects, and a linkage map designating a set of objects to be linked with each other, the contents including content attribute values that are indexing values different from the linkage attribute values;

searching for a linkage candidate of a new object by comparing content attribute values of items included in contents of the new object with linkage attribute values of the items of already-registered objects in order to extract an already-registered object to be linked with the new object as the linkage candidate from the already-registered objects based on degree of agreement between the content attribute values and the linkage attribute values in each of the items;

copying a first linkage attribute value of an already-registered object extracted based on the degree of agreement to the new object as a second linkage attribute value of the new object in order to register the new object in the storage device, the new object including the contents and the second linkage attribute value which is the same as the first linkage attribute value of the already-registered object;

registering the new object in the linkage map by associating the new object with an identification value, wherein the identification value identifies an object set which contains objects that are different from each other and that have the second linkage attribute value in common;

receiving a linkage request from a user terminal, and obtaining the object set from the linkage map; and     assigning element objects of the object set to display areas designated by a display information table, and launching creation systems for operating the element objects in order to enable the user terminal to browse the element objects.

7. The object linkage method as claimed in claim 6, wherein the method further comprises a step of registering a type map in the storage device, including an object type identifying each creation system, and     the step of searching includes a step of searching for the linkage candidate using the value corresponding to the item and the object type.

8. The object linkage method as claimed in claim 7, the object linkage method further comprising the step of, when an object that is currently browsed is edited, updating contents of the object that is currently browsed with contents of a related object including the newest edited contents of the edited object.

9. The object linkage method as claimed in claim 8, wherein each of the linkage attribute values is a value registered in an item included in the object.

10. The object linkage method as claimed in claim 9, wherein each creation system includes a TODO system, an event management system, a meeting management system, a document management system, a forum management system, a calendar management system, or a project management system.

11. A non transitory computer-readable storage medium storing a program for causing a computer used for linking a plurality of objects to function as:

a unit configured to store objects in a storage device, each including contents and linkage attribute values used for linking objects, and to store a linkage map designating a set of objects to be linked with each other, the contents including content attribute values that are indexing values different from the linkage attribute values;

an object registration unit configured to search for a linkage candidate of a new object by comparing content attribute values of items included in contents of the new object with a linkage attribute values of the items of already-registered objects in order to extract and already-registered object to be linked with the new object as the linkage candidate from the already-registered objects based on degree of agreement between the content attribute values and the linkage attribute values in each of the items, and to copy a first linkage attribute value of the already-registered object extracted based on the degree of agreement to the new object as a second linkage attribute value of the new object in order to register the new object in the storage device, the new object including the contents and the second linkage attribute value which is the same as the first linkage attribute value of the already-registered object;

an object linkage unit configured to register the new object in the linkage map by associating the new object with an identification value, wherein the identification value identifies an object set which contains objects that are different from each other and that have the second linkage attribute value in common; and     an object editing unit configured to receive a linkage request from a user terminal, obtain the object set from the linkage map, assign element objects of the object set to display areas designated by a display information table, and launch creation systems for operating the element objects in order to enable the user terminal to browse the element objects.

12. The non-transitory computer-readable storage medium as claimed in claim 11,     wherein the storage device further registers a type map including an object type for identifying each creation system, and the object registration unit searches for the linkage candidate using the content attribute values corresponding to the item and the object type.

13. The non-transitory computer-readable storage medium as claimed in claim 12,     wherein, when an object that is currently browsed is edited, the object editing unit updates contents of the object that is currently browsed with contents of a related object including the newest edited contents of the edited object.

14. The non-transitory computer-readable storage medium as claimed in claim 13,     wherein the linkage attribute value is a value registered in an item included in the object.

15. The non-transitory computer-readable storage medium as claimed in claim 14,     wherein each creation system includes a TODO system, an event management system, a meeting management system, a document management system, a forum management system, a calendar management system, or a project management system.

\* \* \* \* \*